(12) United States Patent
Beroul (10) Patent No.: US 9,205,911 B2
(45) Date of Patent: Dec. 8, 2015

(54) PITCH STABILIZER AND ROTARY-WING AIRCRAFT EQUIPPED WITH SUCH STABILIZER

(71) Applicant: AIRBUS HELICOPTERS, Marginane (FR)

(72) Inventor: Frederic Beroul, Aix en Provence (FR)

(73) Assignee: Airbus Helicopters, Marignane (FR)

( * ) Notice: Subject to any disclaimer, the term of this patent is extended or adjusted under 35 U.S.C. 154(b) by 183 days.

(21) Appl. No.: 14/028,690

(22) Filed: Sep. 17, 2013

(65) Prior Publication Data

US 2014/0077026 A1    Mar. 20, 2014

(30) Foreign Application Priority Data

Sep. 17, 2012 (FR) ...................................... 12 02464

(51) Int. Cl.
  *B64C 27/82* (2006.01)
  *B64C 5/16* (2006.01)
  *B64C 27/06* (2006.01)
  *B64C 5/02* (2006.01)

(52) U.S. Cl.
  CPC ...... *B64C 5/16* (2013.01); *B64C 5/02* (2013.01); *B64C 27/06* (2013.01); *B64C 27/82* (2013.01); *B64C 2027/8281* (2013.01)

(58) Field of Classification Search
  CPC ..................................................... B64C 27/82
  USPC ................... 244/17.11, 17.13, 17.19
  See application file for complete search history.

(56) References Cited

U.S. PATENT DOCUMENTS

| 1,890,059 A | | 12/1932 | Lake |
| 3,075,727 A | * | 1/1963 | Ellis et al. ................... 244/17.13 |
| 3,902,688 A | * | 9/1975 | Seibel et al. ............... 244/17.11 |
| 4,043,523 A | | 8/1977 | Bartoe, Jr. |
| 6,123,291 A | * | 9/2000 | Dequin et al. ............. 244/17.13 |
| 6,830,214 B2 | | 12/2004 | Carson |
| 2012/0018570 A1 | | 1/2012 | Borie et al. |
| 2012/0138739 A1 | | 6/2012 | Lhermenault et al. |

FOREIGN PATENT DOCUMENTS

| CN | 201633921 U | 11/2010 |
| EP | 2409917 A1 | 1/2012 |

(Continued)

OTHER PUBLICATIONS

French Search Report Dated Jul. 22, 2013, Application No. 1202464, Applicant Eurocopter, 6 pages.

(Continued)

*Primary Examiner* — Brian M O'Hara
*Assistant Examiner* — Keith L Dixon
(74) *Attorney, Agent, or Firm* — Brooks Kushman P.C.

(57) ABSTRACT

A pitch stabilizer [10] equipped with an upper stabilizer surface [15] and a lower stabilizer surface [20], with the upper stabilizer surface [15] being located in an upper plane [P1] and with the lower stabilizer surface [20] being located in a lower plane [P2], with the upper plane [P1] overhanging the lower plane [P2]. The upper stabilizer surface [15] is rotatable about an upper axis of rotation [AX1], with the said lower stabilizer surface [20] being rotatable about a lower axis of rotation [AX2], with the stabilizer means [10] having linking means [30] whereby a rotary movement of one stabilizer surface causes an equal rotary movement of the other stabilizer surface.

20 Claims, 2 Drawing Sheets

(56) References Cited

FOREIGN PATENT DOCUMENTS

| | | | |
|---|---|---|---|
| FR | 2167249 | A1 | 8/1973 |
| FR | 2962972 | A1 | 1/2012 |
| FR | 2966425 | A1 | 4/2012 |
| GB | 313415 | A | 6/1929 |
| WO | 9317909 | A1 | 9/1993 |
| WO | 2004007282 | A2 | 1/2004 |

OTHER PUBLICATIONS

Chinese First Office Action Dated Jun. 3, 2015, Application No. 201310692415 5, Applicant Airbus Helicopters, 9 pages.

* cited by examiner

PITCH STABILIZER AND ROTARY-WING AIRCRAFT EQUIPPED WITH SUCH STABILIZER

CROSS-REFERENCE TO RELATED APPLICATIONS

This application claims priority to French patent application No. FR 12 02464 filed Sep. 17, 2012 the disclosure of which is incorporated in its entirety by reference herein.

BACKGROUND OF THE INVENTION (1) Field of the Invention

The present invention relates to a pitch stabilizer and to a rotary-wing aircraft equipped with such a pitch stabilizer, particularly to minimize the attitude-hump phenomenon. Thus, the invention lies within the limited technical field of aircraft that are subject to the attitude-hump phenomenon.

(2) Description of Related Art

Traditionally, a helicopter includes, for example, a fuselage that extends longitudinally from a front end to a tail end on either side of a symmetrical antero-posterior plane and that extends in a vertical direction from a lower portion equipped with landing gear to an upper portion equipped with a main lifting and propulsion rotor.

The helicopter also has a tail rotor at its tail end. In particular, the function of the tail rotor is to counteract the yaw torque applied to the fuselage by the main rotor. This tail rotor also makes it possible to control the movements of the helicopter in yaw.

Helicopters sometimes also include additional stabilizer surfaces. For example, helicopters are customarily equipped with a surface that stabilizes continuous movements in yaw. Such a surface is located, for example, in the antero-posterior plane, so as to counteract the said yaw torque when the aircraft is operating at a high forward speed.

Such a surface that stabilizes yaw movements is generally known as a "tailfin" or "vertical stabilizer".

Similarly, a helicopter sometimes has pitch stabilizer means that have an angle whose absolute value is between 0° and plus or minus 90° in relation to the said antero-posterior plane. These pitch stabilizer means include, for example, two pitch stabilizer surfaces extending symmetrically on either side of the said antero-posterior plane.

Such means for stabilizing pitch movements are sometimes referred to as the "horizontal empennage" or, more simply thereafter, as the "empennage". The term "empennage" is more commonly used, because the stabilizer means are not necessarily horizontal. The phrase "pitch stabilizer means" is also used.

An empennage may consist of at least one traversing aerodynamic surface that passes from side to side transversely through the tail end of the aircraft, or, more preferably, at least one non-traversing aerodynamic surface that extends transversely from the said tail end.

Pitch stabilizer means are highly effective, with their effectiveness increasing in proportion to the forward speed of the helicopter. It is also acknowledged that the effectiveness of pitch stabilizer means is maximized when the wing area of the said means is maximized.

Nevertheless, the airflow over the main rotor of a traditional helicopter in flight is deflected downward, and, in some flight regimes, impacts the pitch stabilizer means, particularly during the transition to low speed, or even in hovering flight.

This airflow thus applies forces to the pitch stabilizer means, and the pilot compensates for those forces by operating his flight controls.

However, when flight conditions vary, the deflection of the airflow is also changed. The same holds true for the forces applied to the pitch stabilizer means.

Those skilled in the art refer to this phenomenon as "attitude hump".

In the transition regime and, for example, between 40 and 80 knots (kt), the forces applied by the airflow over the main rotor tend primarily to displace the empennage and, by impacting the pitch stabilizer means, cause the helicopter to adopt a nose-up attitude. This flight regime is usually known as a "transition regime", because it usually occurs at low speed between a hovering flight regime and a cruising flight regime.

To balance the helicopter, the pilot must use his handle that controls the cyclic pitch of the main rotor blades in order to lower the nose-up attitude of the helicopter.

The resulting swerve degrades the performance of the aircraft. Furthermore, the shift of the aircraft into the nose-up attitude interferes with the pilot's visibility, especially in an approach regime.

Clearly, optimizing the pitch stabilizer means by maximizing the wing area of the said means simply accentuates the attitude hump.

Therefore, it appears impossible to use pitch stabilizer means having a large wing area on a helicopter without exacerbating the attitude-hump phenomenon.

The known remedies for this problem include stabilizer means equipped with a fixed aerodynamic stabilizer surface and a mobile aerodynamic surface. The position of the mobile surface in relation to the fixed stabilizer surface can then be controlled via the flight controls, so as to limit the attitude-hump phenomenon.

The term "stabilizer surface" is understood as referring to an elongated aerodynamic body, especially of the empennage type.

Although worthwhile, this architecture requires flight controls that lead to an increase in the mass of the aircraft, in addition to increasing the complexity of the aircraft.

A second solution consists of implementing pitch stabilizer means for a rotary-wing aircraft that are located outside the wake of the said rotary wing. However, the second solution may actually cause a significant reduction in the effectiveness of the stabilizer means, while also imposing implementation constraints.

Document FR 2962972 relates to a rotary-wing aircraft equipped with a fuselage that extends longitudinally from a front end to a tail end, and that is equipped with one upper pitch stabilizer means and at least one lower pitch stabilizer means. Each lower stabilizer means is positioned in the wake of the upper stabilizer means generated by an airflow passing over the rotary wing and impacting an upper surface of an upper stabilizer means.

The technological prior art also includes document FR 2966425, which describes an aircraft that includes an empennage and means for combating an aeroelastic flutter phenomenon.

Document FR 2167249 also describes an aircraft equipped with a V-shaped tail empennage.

Document U.S. Pat. No. 3,902,688 describes an aircraft equipped with a horizontal stabilizer located at the top of a vertical fin, and a horizontal stabilizer located at the bottom of this vertical fin.

Document WO 2004/007282 is also known.

Thus, the purpose of the present invention is to propose pitch stabilizer means for a rotary-wing aircraft, with a view toward minimizing the attitude-hump phenomenon.

BRIEF SUMMARY OF THE INVENTION

According to the invention, one embodiment of a pitch stabilizer ("pitch stabilizer means") is equipped with an upper stabilizer surface and a lower stabilizer surface. Thus, because the upper stabilizer surface is located in a so-called "upper plane" and the lower stabilizer surface is located in a so-called "lower plane", the upper plane overhangs the lower plane.

Furthermore, the upper stabilizer surface is rotatable about an upper axis of rotation, with the lower stabilizer surface being rotatable about a lower axis of rotation. The stabilizer means include linking means whereby a rotary movement of one stabilizer surface causes an equal rotary movement of the other stabilizer surface, with an upper centroid for the application of changes in force to the upper stabilizer surface being located between the said upper axis of rotation and an upper leading edge of the upper stabilizer surface, and with a lower centroid for the application of changes in force to the lower stabilizer surface being located between a lower trailing edge of the lower stabilizer surface and the lower axis of rotation.

The phrase "equal rotary movements" is understood as referring to two rotary movements that occur in the same direction, or even at the same amplitude.

Consequently, if the upper stabilizer surface performs a clockwise rotation, then the linking means cause the lower stabilizer surface to rotate in the same direction, i.e., clockwise.

Thus, the linking means constitute control means that can induce rotary movements of the same type by the lower and upper stabilizer surfaces.

Accordingly, these linking means and the location of the aerodynamic centroids in relation to the axes of rotation allow a rotary movement of the lower stabilizer surface to generate a similar rotary movement of the upper stabilizer surface in certain flight regimes, and also allow a rotary movement of the lower stabilizer surface to be blocked by the absence of a rotary movement, or by a rotary movement of lesser amplitude, by the upper stabilizer surface in other flight regimes.

The dimensions of the stabilizer surfaces and/or of the linking means are selected so as to nullify or minimize any torque exerted on the stabilizer surfaces as the result of an angle of attack applied to all of these stabilizer surfaces.

Conversely, in the case of a differential angle of attack, the torque on the assembly becomes significant and causes both of the stabilizer surfaces to pivot.

This is the case in a transition-flight regime that occurs between a minimum speed threshold and a maximum speed threshold: for example, thresholds on the order of 40 knots and 80 knots, respectively. Thus, the transition-flight regime occurs, for example, between a hovering-flight regime and a cruising-flight regime.

These speed thresholds are speed thresholds for the forward flight of the rotary-wing aircraft equipped with pitch stabilizer means.

In fact, in a transition-flight regime, the lower stabilizer surface is located in the wake of the rotary wing.

However, the upper stabilizer surface is located in an upper plane that is vertically aligned with the lower stabilizer surface. Thus, this upper stabilizer surface is vertically shifted in relation to the lower stabilizer surface. This upper stabilizer surface may also be shifted longitudinally in relation to the lower stabilizer surface, that is, in the longitudinal direction of the aircraft equipped with the invention.

Consequently, in a transition flight, the stabilizer surface is either outside the wake of the rotary wing or impacted by an airflow whose incidence is weaker than that of the airflow impacting the lower stabilizer surface.

In this transition-flight regime, the airflow from the rotary wing tends to induce a rotation of the lower stabilizer surface. However, this airflow does not impact the upper stabilizer surface, or impacts it at a lower angle of attack.

Thus, the airflow generates torque at the lower centroid that is greater than the torque being applied to the upper centroid.

The linking means then enable a rotation of the lower stabilizer surface, and consequently a rotation of the upper stabilizer surface. According to the invention, the lower stabilizer surface orients itself naturally, in accordance with the angle of attack of the airflow impacting it.

Conversely, in a cruising-flight regime, each stabilizer surface is impacted by essentially the same airflow. Because of the position of the lower and upper centroids in relation to the pitch joint of the stabilizer surfaces, the stabilizer surfaces tend to perform opposing rotations of the same amplitude, which are nullified through the linking means. Accordingly, the stabilizer surfaces remain essentially in a single given position.

Thus, the purpose of the lower stabilizer surface is to stabilize the pitch movement of an aircraft, while the primary function of the upper stabilizer surface is to place the lower stabilizer surface in its proper position, doing so through the linking means. The lower stabilizer surface may therefore include a wing area that is substantially larger than the wing area of the upper stabilizer surface.

The term "wing area" of a stabilizer surface is understood as referring to the area of this stabilizer surface projected onto a plane, with the inclusion of the part of the stabilizer surface that is present in a fuselage. Reference may be made to the literature for additional information about wing areas.

The term "surface" is synonymous with the term "area" in the phrase "wing area", whereas this term "surface" is synonymous with the phrase "aerodynamic body" in the phrase "stabilizer surface".

Thus, these characteristics tend to reduce the attitude-home phenomenon, by enabling an orientation of the stabilizer surfaces in the transition-flight regime.

The stabilizer means may also include one or more of the additional characteristics described below.

In fact, the stabilizer means may include upper mobility means enabling the rotation of the said upper stabilizer surface about an upper axis of rotation, and lower mobility means enabling the rotation of the said lower stabilizer surface about a lower axis of rotation.

Thus, each stabilizer surface includes mobility means in order to enable a rotation in relation to an aircraft fuselage.

Reference may be made to the prior art with regard to the rotative attachment of a stabilizer surface to the structure of an aircraft.

At least one mobility means may include a shaft that is an integral part of the corresponding stabilizer surface, with the said shaft being suitable for being joined to an aircraft fuselage.

Furthermore, at least one mobility means may include biasing means for the corresponding stabilizer surface, tending to keep this stabilizer surface in a stable position.

Such biasing means make it possible to prevent a violent transient event (such as a gust of wind, a sudden change in direction, etc.) from causing an unwanted rotation, such as, for example, a rotation of the upper airfoil or lifting surface, with a resulting rotation of the lower airfoil or lifting surface.

Furthermore, during cruising flight, these biasing means tend to position the stabilizer surfaces in a position defined by the manufacturer.

In fact, in a transition-flight regime, the stabilizer surfaces may pivot in relation to the said position.

Conversely, when the aircraft enters a cruising-flight regime, the biasing means tend to return the stabilizer surfaces to the said position.

The said biasing means may optionally include stiffening means that display a predetermined angular stiffness, on the order, for example, of one Newton-meter per degree.

These biasing means may include a damping element to limit, for example, the dynamic effects of the vortices generated by the blades of a rotary wing.

Furthermore, the stabilizer means may include at least one stop in order to limit the rotation of the lower stabilizer surface toward a nose-down or nose-up attitude.

Such a stop may be implemented in order to prevent, for example, the stalling of the upper stabilizer surface, which would make the control less effective.

In a first embodiment, the linking means consist of mechanical means.

These linking means include at least one mechanical linkage joined to the lower stabilizer surface and to the upper stabilizer surface.

This mechanical linkage may be equidistant from the upper axis of rotation and from the lower axis of rotation.

The linkage may include, for example, at least one rod cooperating with an upper joint connected to the upper stabilizer surface, with one lower joint connected to the lower stabilizer surface. The distance separating this upper joint from the upper axis is then equal to the distance separating this lower joint from the lower axis.

In a variant of the embodiment, the upper axis of rotation may be located between an upper centroid for the application of changes in force to the upper stabilizer surface and an upper trailing edge of the upper stabilizer surface, with the upper stabilizer surface including an intermediate portion extending along the chord of the upper centroid to the upper axis of rotation, and an upper rear portion extending along the chord of the upper axis of rotation to the upper trailing edge.

Conversely, the lower axis of rotation is located between a lower centroid for the application of changes in force to the lower stabilizer surface and a lower leading edge of the lower stabilizer surface, with the said lower stabilizer surface including a lower front portion extending along the chord of a lower leading edge of the lower stabilizer surface to the lower axis of rotation, and an intermediate segment extending along the chord of the lower axis of rotation to the lower centroid, and a lower rear portion extending along the chord of the said lower centroid to the lower trailing edge.

Thus, with regard to an airflow impacting each airfoil or lifting surface, the axis of rotation of the upper stabilizer surface is located downstream of the upper centroid for the application of forces to this upper stabilizer surface. Conversely, the axis of rotation of the lower stabilizer surfaces located upstream of the lower centroid for the application of forces to this lower stabilizer surface.

Thus, the servo means may include a first mechanical linkage connecting the lower front portion to the intermediate portion, and a second mechanical linkage connecting the lower rear portion to the upper rear portion.

Thus, an airflow impacting the stabilizer surfaces at the same angle of attack would tend to induce equal rotary movements of these stabilizer surfaces.

Each mechanical linkage may include conventional elements, such as rods, cables, transmission means, etc.

This embodiment is relatively simple, and allows automatic adjustment of the position of the stabilizer surfaces.

According to a variant of this embodiment, the upper axis of rotation is vertically aligned with the lower axis of rotation.

This variant makes it possible, for example, to simplify the linking means.

Furthermore, the first linkage may be connected to the lower leading edge, and/or the second linkage may be connected to the upper trailing edge, in order to maximize their effectiveness.

According to one embodiment:

The upper axis of rotation is located between an upper centroid for the application of changes in force to the upper stabilizer surface and an upper trailing edge of the upper stabilizer surface, with this upper axis of rotation being located at a first distance from the upper centroid;

The lower axis of rotation is located between a lower centroid for the application of changes in force to the lower stabilizer surface and a lower leading edge of the lower stabilizer surface, with this lower axis of rotation being located at a second distance from the lower centroid;

The upper stabilizer surface has a first wing area, and the lower stabilizer surface has a second wing area; and A first ratio of the first distance and the second distance is equal to a second ratio of the second wing area and the first wing area.

Consequently, an upper airfoil or lifting surface having a reduced wing area may prevent a rotation of a lower airfoil or lifting surface having a sizable wing area, in the presence of an airflow displaying equivalent angles of attack in relation to these surfaces.

This first ratio is, for example, between 2 and 10.

According to a second embodiment, the linking means may include an electronic device that contains, for example, sensors, electric motors, and an electronic force- and control-management device that makes it possible to observe the principles regarding the blocking and the release of the pivoting of the device according to the invention.

The invention also relates to an aircraft equipped with the fuselage extending longitudinally from a nose to a tail end. This aircraft has a rotary wing carried by the fuselage between the nose and the tail end, with the aircraft having stabilizing means carried by the fuselage between the tail end and the rotary wing.

This aircraft may be a helicopter or any other type of rotorcraft. For example, the aircraft may have airfoils and a propulsion system, or may be of the convertible type.

In such a case, the stabilizer means will consist of stabilizer means according to the invention, of the type described hereinabove.

Furthermore, each stabilizer surface may be, indiscriminately, either traversing, in that it passes laterally through the fuselage from side to side, or non-traversing, in that it extends laterally from the fuselage.

Each stabilizer surface may be located on a tail boom of the fuselage, or on at least one tailfin or vertical stabilizer of this fuselage.

BRIEF DESCRIPTION OF THE SEVERAL
VIEWS OF THE DRAWINGS

The invention and its advantages will become clear in greater detail within the scope of the following description, which includes examples of embodiments provided for illustrative purposes, with reference to the attached figures, which represent.

The elements that are present in two or more different figures are designated by a single individual reference.

DETAILED DESCRIPTION OF THE INVENTION

Figure 1:
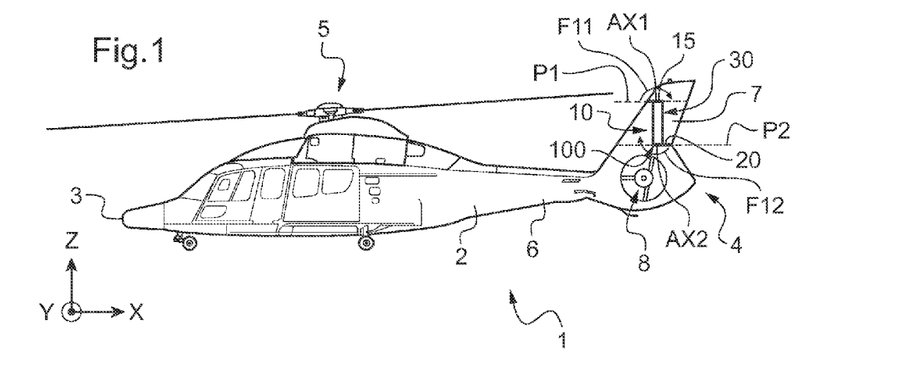
FIG. 1: An aircraft according to the invention.

It should be noted that three directions—X, Y, and Z—that are orthogonal to each other are shown in FIG. 1.

The first direction, X, is known as the longitudinal direction. The term "longitudinal" refers to any direction that is parallel to the first direction, X.

The second direction, Y, is known as the transverse direction. The term "transverse" refers to any direction that is parallel to the second direction, Y.

Last, the third direction, Z, is known as the elevation. The phrase "in elevation" refers to any direction that is parallel to the third direction, Z.

FIG. 1 shows an aircraft [1] according to the invention.

This aircraft has a fuselage [2] that extends longitudinally from a nose [3] to a tail end [4], transversely from a left side to a right side.

The fuselage also extends in elevation from a lower portion equipped with landing gear to an upper portion equipped with a rotary wing [5].

The fuselage [2] may include a tail boom [6] extended toward the tail end [4] by a tailfin or vertical stabilizer [7]. The aircraft [1] may then have a tail rotor [8] that is secured to the tailfin or vertical stabilizer [7], such as, for example, a shrouded rotor.

This aircraft [1] is further equipped with means [10] for stabilizing pitch movements. As used herein the terms "stabilizer means" and "pitch stabilizer" are used interchangeably, unless the context dictates otherwise. These stabilizer means [10] are carried by the fuselage [2], between the nose [3] and the tail end [4]. More specifically, the stabilizer means [10] are located between the rotary wing [5] and the tail end [4].

The stabilizer means [10] include two stabilizer surfaces.

Each stabilizer surface includes an aerodynamic body extending transversely in relation to the fuselage [2]. More specifically, each stabilizer surface may extend laterally from one side of the aircraft, or may even extend from both sides of the aircraft on each side of the aircraft.

Each stabilizer surface may be, indiscriminately, either traversing, in that it passes laterally through the fuselage [2] from side to side, or non-traversing, in that it extends laterally from the said fuselage.

The two stabilizer surfaces shown in the figure also include at least one aerodynamic segment extending from the same side of the aircraft. However, one stabilizer surface may extend from one side of the aircraft, with the other stabilizer surface extending from the other side of the aircraft.

Each stabilizer surface may also display an acute angle in relation to the fuselage [2], or may even be essentially perpendicular to this fuselage.

The two stabilizer surfaces are respectively essentially positioned in an upper plane [P1] and a lower plane [P2], with the upper plane being vertically aligned with the lower plane.

Thus, the stabilizer surface that is present in the upper plane is known as the "upper stabilizer surface [15]". Similarly, the stabilizer surface that is present in the lower plane is known as the "lower stabilizer surface [20]".

Thus, the upper stabilizer surface [15] and the lower stabilizer surface [20] are shifted or offset in elevation. The upper stabilizer surface [15] and the lower stabilizer surface [20] may also be shifted or offset longitudinally.

In fact, according to the example shown in FIG. 1, the upper stabilizer surface [15] and the lower stabilizer surface [20] are located on the tailfin [4]. Thus, the leading edge of the upper stabilizer surface [15] is upstream of the leading edge of the lower stabilizer surface [20] in terms of the direction of forward travel of the aircraft.

Figure 2:
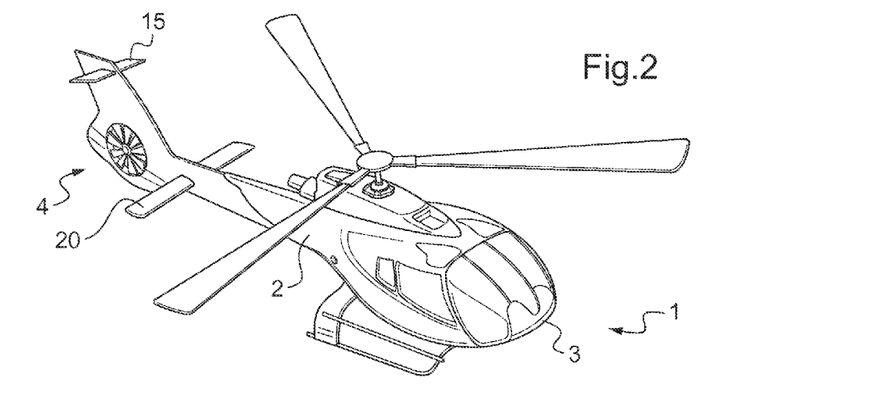
FIGS. 2 and 3: Aircraft according to variants in the position of the stabilizer surfaces.

Conversely, according to the embodiment shown in FIG. 2, the stabilizer means include a lower stabilizer surface [20] that traverses the tail boom, and an upper stabilizer surface [15] that traverses the tailfin of the aircraft.

Figure 3:
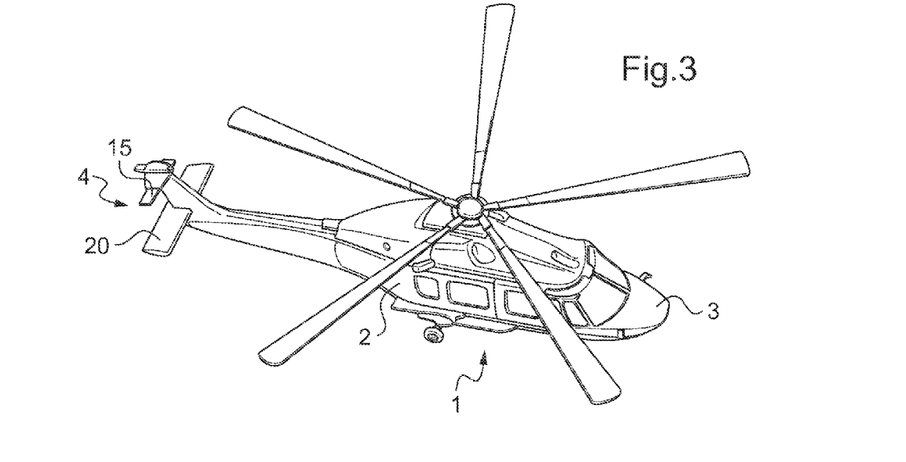

According to the embodiment shown in FIG. 3, the stabilizer means include a lower stabilizer surface [20] that traverses the tailfin of the aircraft, and a non-traversing upper stabilizer surface [15] extending outward from the right side of the aircraft. The leading edge of the upper stabilizer surface [15] is more upstream of the leading edge of the lower stabilizer surface [20] in terms of the direction of forward travel of the aircraft.

Naturally, other embodiments can also be envisioned.

Thus, regardless of the variant, the upper stabilizer surface [15] and the lower stabilizer surface [20] are shifted or offset in elevation and longitudinally.

The position of the upper stabilizer surface [15] may be selected in such a way that, in the transition-flight regime, this upper stabilizer surface [15] is impacted by an airflow displaying less deflection than the airflow impacting the lower stabilizer surface [20]. In an extreme embodiment, the upper stabilizer surface [15] may be located outside the aerodynamic wake of the rotary wing [5].

Furthermore, the upper stabilizer surface [15] is rotatable about an upper axis of rotation [AX1], with the lower stabilizer surface [20] being rotatable about a lower axis of rotation [AX2].

In this case, the stabilizer means [10] are equipped with linking means [30], whereby a rotary movement of one stabilizer surface causes an equivalent rotary movement of the other stabilizer surface.

As an illustrative example, a clockwise rotary movement [F11] of the upper stabilizer surface [15] induces a clockwise rotary movement [F12] of the lower stabilizer surface [20], doing so through the linking means [30].

In such a case, the dimensions of the stabilizer means are selected in such a way that the lower and upper stabilizer surfaces tend to perform opposing rotary movements of the same amplitude when these lower and upper stabilizer surfaces are impacted by a single airflow. The presence of the linking means then neutralizes the rotation of the lower and upper stabilizer surfaces.

Conversely, in a transition-flight regime, the incident airflow impacting the lower stabilizer surface [20] may cause a rotation of this lower stabilizer surface [20].

Because this incident airflow impacts the upper stabilizer surface [15] to a lesser extent, the opposing rotary movement of the upper stabilizer surface [15] does not prevent the rotation of the lower stabilizer surface [20].

The lower stabilizer surface [20] then performs a rotary movement in order to achieve an optimal position. Simultaneously, the upper stabilizer surface performs a movement that is equal to the rotary movement of the lower stabilizer surface [20].

The stabilizer means may also include at least one stop [100] in order to limit the rotation of the lower stabilizer surface toward a nose-down or nose-up attitude. For example, a stop [100] is used to limit the rotation of the lower stabilizer surface to a nose-up attitude.

Conversely, in a cruising-flight regime, the stabilizer surfaces do not perform any rotary movements. In fact, the lower stabilizer surface tends to perform a rotary movement that is actually countered by the opposing rotary movement that the upper stabilizer surface tends to form.

Figure 4:
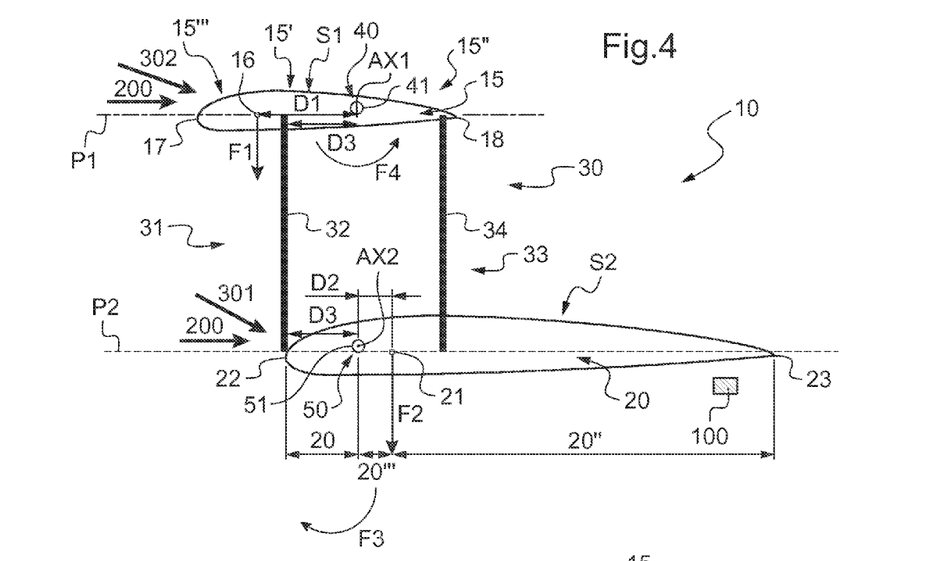
FIG. 4: A first variant of a mechanical embodiment of the invention.

With reference to FIG. 4, the stabilizer means may include upper mobility means [40] enabling the rotation of the upper stabilizer surface [15] about the upper axis of rotation [AX1]. Similarly, lower mobility means [50] enable a rotary movement of the lower stabilizer surface [20] about a lower axis of rotation [AX2].

For example, at least one mobility means includes a shaft [41] [51] that is coaxial with the corresponding axis of rotation. Each shaft thus forms an integral part of the corresponding stabilizer surface, and is joined to the fuselage [2] the aircraft.

Figure 6:
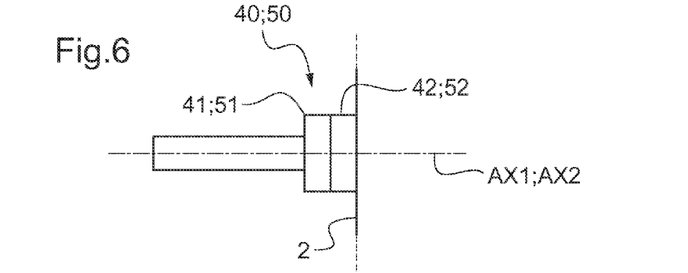
FIG. 6: A schematic view of one biasing means.

With reference to FIG. 6, each mobility means [40] [50] may include biasing means [42] [52] for the corresponding stabilizer surface.

Each biasing means tends to keep this stabilizer surface in a stable position. The stable position may be the target position that is desired in a cruising-flight regime.

Each biasing means [42] [52] may optionally include stiffening means—such as, for example, elastomeric stiffening means—that display a predetermined angular stiffness.

Each biasing means [42] [52] may include damping means (which may be residual if the stiffening is achieved by means of an elastomer or an additional element).

The linking means may also consist of electronic means.

However, with reference to FIG. 4, the linking means may consist of mechanical means.

Regardless of the variant, the lower airfoil [20] extends, parallel to the longitudinal axis of the aircraft, from a leading edge [22] to a trailing edge [23]. For the sake of convenience, the leading edge is referred to as the "lower leading edge", while for the sake of convenience the trailing edge is referred to as the "lower trailing edge".

Traditionally, the changes in force generated by the upper airfoil are applied at an aerodynamic centroid known as the "lower centroid [21]".

Similarly, the upper airfoil [15] extends, parallel to the longitudinal axis of the aircraft, from a leading edge [17] to a trailing edge [18]. For the sake of convenience, the leading edge is referred to as the "upper leading edge", while for the sake of convenience the trailing edge is referred to as the "upper trailing edge".

Traditionally, the forces generated by the lower [sic] airfoil are applied at a centroid known as the "upper centroid [16]".

According to the variant shown in FIG. 4, the upper axis of rotation [AX1] is located between the upper centroid [16] for the application of forces from the upper stabilizer surface [15] and the upper trailing edge [18].

The upper stabilizer surface [15] then includes, from the upper leading edge [17] to the trailing edge [18]: a first segment, known as the "upper front portion [15'']", between the upper leading edge [17] and the upper centroid [16]; a second segment, known as the "intermediate portion [15']", extending along the chord of the upper centroid [16] to the upper axis of rotation [AX1]; and then a third segment, known as the "upper rear portion [15''']", extending along the chord of the upper axis of rotation [AX1] to the upper trailing edge [18].

Furthermore, the lower axis of rotation [AX2] is located between a lower centroid [21] for the application of changes in force to the lower stabilizer surface [20] and the lower leading edge [22].

The lower stabilizer surface [20] then includes successively, from the lower leading edge [22] to the lower trailing edge [23]: a first segment known as the "lower front portion [20']", extending along the chord of a lower leading edge [22] to the lower axis of rotation [AX2]; then a second segment, known as the "intermediate segment [20''']", extending along the chord of the lower axis of rotation [AX2] to the lower centroid [21]; and then third segment, known as the "lower rear portion [20'']", extending along the chord of the lower centroid [21] to the lower trailing edge [23].

According to one mechanical embodiment, the linking means [30] include at least one mechanical linkage [31] [33] that is joined to the lower stabilizer surface [20] and to the upper stabilizer surface [15].

Each mechanical linkage may be located at an equal distance [D3] [D4] from the upper axis of rotation [AX1] and from the lower axis of rotation [AX1].

In the example shown, a first mechanical linkage [31] connects the lower front portion [20'] to the intermediate portion [15']. Furthermore, a second mechanical linkage [33] connects the lower rear portion [20''] to the upper rear portion [15''].

For example, the first link [31] is connected to the lower leading edge [22]. Furthermore, the second link [33] is connected to the upper trailing edge [18].

In this context, the position of the aerodynamic centroids in relation to the axes of rotation tends to induce opposing rotations of the stabilizer surfaces under the effect of a single airflow. When the lower stabilizer surface is impacted by an airflow, the lower stabilizer surface is subjected to a lesser change in force [F2] that is applied to the lower centroid [21] and that tends to induce an initial rotation [F3].

Similarly, when the upper stabilizer surface is impacted by an airflow, this upper stabilizer surface is subjected to a greater change in force [F1] that is channeled in the same direction as the lesser change in force [F2]. This greater change in force [F1] is applied to the upper centroid [16] and tends to induce a second rotation [F4] that opposes the first rotation [F3].

These opposing rotations are due to the fact that the aerodynamic centroid [16] of the upper stabilizer surface is located between the leading edge and the axis of rotation of this upper stabilizer surface, whereas the aerodynamic centroid [21] of the lower stabilizer surface is located between the axis of rotation and the trailing edge of this lower stabilizer surface However, if the first rotation and the second rotation have the same amplitude, the linking means will neutralize them automatically, with one rotation nullifying the other rotation.

For this purpose, the upper axis of rotation [AX1] may be located at a first distance [D1] from the upper centroid [16], while the lower axis of rotation [AX2] is located at a second distance [D2] from the lower centroid [21].

Now then, the upper stabilizer surface [15] has a first wing area [S1], and the lower stabilizer surface [20] has a second wing area [S2]. The second wing area [S2] may be larger than the first wing area [S1].

Accordingly, a first ratio of the first distance [D1] and the second distance [D2] may be equal to a ratio of the second wing area [S2] and the first wing area [S1].

Consequently, when both of the stabilizer surfaces are subjected to two airflows [200] that have the same angle of attack, the upper stabilizer surface [15] prevents the rotation of the lower stabilizer surface, doing so through the linking means.

Conversely, in a transition-flight regime, both of the stabilizer surfaces are subjected to two airflows [301] [302] that have different angles of attack. In an extreme embodiment, the upper stabilizer surface [15] may be located outside the wake of the rotary wing.

In such a case, the torque corresponding to the rotation of the lower stabilizer surface becomes greater than the torque corresponding to the rotation of the upper stabilizer surface. Thus, the lower and upper stabilizer surfaces perform equal rotary movements.

According to the variant shown in FIG. 4, the upper axis of rotation [AX1] may be vertically aligned with the lower axis of rotation [AX2].

Thus, each mechanical linkage may be implemented simply—for example, with no need for transmission means. In particular, this variant may be applied to the example shown in FIG. 1.

Figure 5:
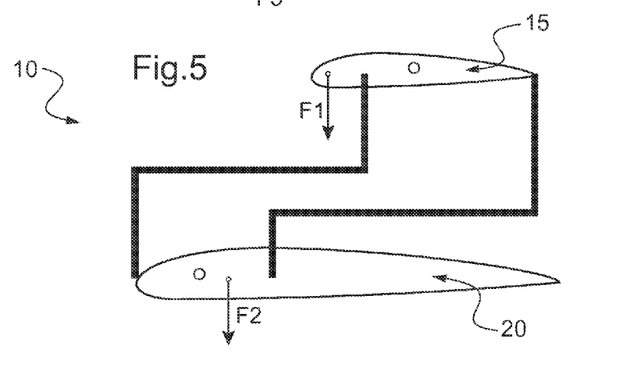
FIG. 5: A second variant of a mechanical embodiment of the invention.

Conversely, the upper axis of rotation [AX1] may be shifted or offset longitudinally in relation to the lower axis of rotation [AX2], in accordance with the variant shown in FIG. 5. This variant may be applied to the example shown in FIGS. 2 and 3.

In such cases, each mechanical link may include a plurality of segments and, for example, transmission means.

Naturally, the present invention is subject to numerous variants in terms of its implementation. Although several embodiments have been described, it will be readily understood that not all of the possible modes can be identified exhaustively. It is of course possible to replace any of the means described herein with equivalent means, without thereby departing from the scope of the present invention.

What is claimed is:

1. An aircraft equipped with a fuselage extending longitudinally from a nose to a rear extremity, the aircraft having a rotary wing carried by the fuselage between the nose and the rear extremity, with the aircraft having a pitch stabilizer carried by the fuselage between the rotary wing and the rear extremity, the pitch stabilizer comprising:
    an upper stabilizer surface and a lower stabilizer surface,
        the upper stabilizer surface being located in an upper plane and the lower stabilizer surface being located in a lower plane, the upper plane overhanging the lower plane, wherein
        the upper stabilizer surface is rotatable about an upper axis of rotation,
        the lower stabilizer surface is rotatable about a lower axis of rotation,
        the pitch stabilizer also having
            linking means whereby a rotary movement of one stabilizer surface causes an equal rotary movement of the other stabilizer surface,
            an upper centroid for the application of changes in force to the upper stabilizer surface located between the upper axis of rotation and an upper leading edge of the upper stabilizer surface, and
            a lower centroid for the application of changes in force to the lower stabilizer surface located between a lower trailing edge of the lower stabilizer surface and the lower axis of rotation.

2. The aircraft according to claim 1, wherein the pitch stabilizer includes upper mobility means enabling the rotation of the upper stabilizer surface about an upper axis of rotation, and lower mobility means enabling the rotation of the lower stabilizer surface about a lower axis of rotation.

3. The aircraft according to claim 2, wherein at least one of the mobility means includes a shaft that is an integral part of the corresponding stabilizer surface, the shaft being suitable for being joined to the fuselage.

4. The aircraft according to claim 2, wherein at least one of the mobility means includes biasing means for the corresponding stabilizer surface, tending to keep the stabilizer surface in a stable position.

5. The aircraft according to claim 4, wherein the biasing means include stiffening means having a predetermined angular stiffness.

6. The aircraft according to claim 1, wherein the linking means include at least one mechanical linkage joined to the lower stabilizer surface and to the upper stabilizer surface.

7. The aircraft according to claim 6, wherein the at least one mechanical linkage is equidistant from the upper axis of rotation and from the lower axis of rotation.

8. The aircraft according to claim 1, wherein:
    the upper axis of rotation is located between the upper centroid for the application of changes in force to the upper stabilizer surface and an upper trailing edge of the upper stabilizer surface, the upper stabilizer surface including an intermediate portion extending along the chord of the upper centroid to the upper axis of rotation, and an upper rear portion extending along the chord of the upper axis of rotation to the upper trailing edge;
    the lower axis of rotation is located between the lower centroid for the application of changes in force to the lower stabilizer surface and a lower leading edge of the lower stabilizer surface, the lower stabilizer surface including a lower front portion extending along the chord of a lower leading edge of the lower stabilizer surface to the lower axis of rotation, and an intermediate segment extending along the chord of the lower axis of rotation to the lower centroid, and a lower rear portion extending along the chord of the lower centroid to the lower trailing edge; and
    the linking means including a first mechanical linkage connecting the lower front portion to the intermediate portion, and a second mechanical linkage connecting the lower rear portion to the upper rear portion.

9. The aircraft according to claim 1, wherein the upper axis of rotation is vertically aligned with the lower axis of rotation.

10. The aircraft according to claim 8, wherein the first linkage is attached to the lower leading edge.

11. The aircraft according to claim 8, wherein the second linkage is attached to the upper trailing edge.

12. The aircraft according to claim 1, wherein:
    the upper axis of rotation is located between an upper centroid for the application of changes in force to the upper stabilizer surface and an upper trailing edge of the upper stabilizer surface, the upper axis of rotation being located at a first distance from the upper centroid;
    the lower axis of rotation is located between a lower centroid for the application of changes in force to the lower stabilizer surface and a lower leading edge of the lower stabilizer surface, the lower axis of rotation being located at a second distance from the lower centroid;
    the upper stabilizer surface has a first wing area, and the lower stabilizer surface has a second wing area; and a first ratio of the first distance and the second distance is equal to a second ratio of the second wing area and the first wing area.

13. The aircraft according to claim 12, wherein the first ratio is between 2 and 10.

14. The aircraft according to claim 1, wherein the pitch stabilizer includes at least one stop to limit the rotation of the lower stabilizer surface.

15. An aircraft according to claim 1, wherein each stabilizer surface is, indiscriminately, either traversing, in that it passes laterally through the fuselage from side to side, or non-traversing, in that it extends laterally from the fuselage.

16. The aircraft according to claim 1, wherein the pitch stabilizer is disposed on the fuselage closer to the rear extremity of the fuselage than the rotary wing.

17. An aircraft comprising:
a fuselage extending longitudinally from a nose to a rear extremity;
a rotary wing carried by the fuselage between the nose and the rear extremity;
a pitch stabilizer carried by the fuselage between the rotary wing and the rear extremity, the pitch stabilizer comprising:
an upper stabilizer surface and a lower stabilizer surface, the upper stabilizer surface being located in an upper plane and the lower stabilizer surface being located in a lower plane, the upper plane overhanging the lower plane, wherein
the upper stabilizer surface is rotatable about an upper axis of rotation,
the lower stabilizer surface is rotatable about a lower axis of rotation,
the pitch stabilizer also having
a linkage whereby a rotary movement of one stabilizer surface causes rotary movement of the other stabilizer surface,
an upper centroid for the application of changes in force to the upper stabilizer surface located between the upper axis of rotation and an upper leading edge of the upper stabilizer surface, and
a lower centroid for the application of changes in force to the lower stabilizer surface located between a lower trailing edge of the lower stabilizer surface and the lower axis of rotation.

18. The aircraft according to claim 17, wherein the rotary movement of the other stabilizer surface is equal to the rotary movement of the one stabilizer surface.

19. The aircraft according to claim 17, wherein the pitch stabilizer includes upper mobilizer enabling the rotation of the upper stabilizer surface about an upper axis of rotation, and lower mobilizer enabling the rotation of the lower stabilizer surface about a lower axis of rotation.

20. The aircraft according to claim 19, wherein at least one of the mobilizer includes a shaft that is an integral part of the corresponding stabilizer surface, the shaft being suitable for being joined to an aircraft fuselage.

* * * * *